(12) United States Patent
Jeong et al.

(10) Patent No.: US 12,260,477 B2
(45) Date of Patent: Mar. 25, 2025

(54) METHOD AND APPARATUS FOR AUTOMATICALLY GENERATING BANNER IMAGE, AND COMPUTER-READABLE STORAGE MEDIUM

(71) Applicant: CAFE24 CORP., Seoul (KR)

(72) Inventors: Hak Su Jeong, Seoul (KR); Cheol Ho Jeong, Anyang-si (KR); Mu Ung Yeom, Suwon-si (KR); Hee Won Park, Seoul (KR); Lan You, Seoul (KR); Jeong Mi Lim, Seoul (KR); Sung Bae Kim, Gwangju-si (KR)

(73) Assignee: CAFE24 CORP., Seoul (KR)

( * ) Notice: Subject to any disclaimer, the term of this patent is extended or adjusted under 35 U.S.C. 154(b) by 258 days.

(21) Appl. No.: 17/912,266

(22) PCT Filed: Mar. 15, 2021

(86) PCT No.: PCT/KR2021/003168
§ 371 (c)(1),
(2) Date: Sep. 16, 2022

(87) PCT Pub. No.: WO2021/187833
PCT Pub. Date: Sep. 23, 2021

(65) Prior Publication Data
US 2023/0222716 A1    Jul. 13, 2023

(30) Foreign Application Priority Data
Mar. 16, 2020   (KR) .......................... 10-2020-0031980

(51) Int. Cl.
*G06T 11/60*   (2006.01)
*G06F 40/109*  (2020.01)
(Continued)

(52) U.S. Cl.
CPC ............ *G06T 11/60* (2013.01); *G06F 40/109* (2020.01); *G06F 40/186* (2020.01); *G06T 11/001* (2013.01); *G06T 11/40* (2013.01)

(58) Field of Classification Search
CPC ........ G06T 11/60; G06T 11/40; G06T 11/001; G06F 40/109; G06F 40/186
See application file for complete search history.

(56) References Cited

U.S. PATENT DOCUMENTS

| 2003/0028451 | A1* | 2/2003 | Ananian | ............ G06Q 30/0615 |
| | | | | 705/26.42 |
| 2016/0124914 | A1 | 5/2016 | Deng | |

(Continued)

FOREIGN PATENT DOCUMENTS

| JP | 2017-538991 A | 12/2017 |
| KR | 10-2015-0102150 A | 9/2015 |

(Continued)

*Primary Examiner* — Michelle Chin
(74) *Attorney, Agent, or Firm* — INVENSTONE PATENT, LLC

(57) ABSTRACT

Provided is a method for automatically generating a banner image for a promotion, performed by a computing device comprising a processor and a memory. The method comprises the steps of: acquiring information about any concept classification to which a product or service to be promoted corresponds from among a plurality of predefined concept classifications; determining a setting value for a foundation that is a minimum unit constituting the design of a banner image, on the basis of the concept classification to which the product or service to be promoted belongs; determining at least one component included in the banner image, on the basis of the setting value for the foundation; and generating at least one banner template including component arrangement information that is information about the location and size of which of the at least one component.

20 Claims, 12 Drawing Sheets

(51) Int. Cl.
  *G06F 40/186* (2020.01)
  *G06T 11/00* (2006.01)
  *G06T 11/40* (2006.01)

(56) References Cited

U.S. PATENT DOCUMENTS

2018/0189823 A1* 7/2018 Xie .................... G06Q 30/0276
2020/0111134 A1* 4/2020 Zheng ................ G06Q 30/0276

FOREIGN PATENT DOCUMENTS

| | | |
|---|---|---|
| KR | 10-2018-0065959 A | 6/2018 |
| KR | 10-1958773 B1 | 3/2019 |
| KR | 10-2020-0004114 A | 1/2020 |

* cited by examiner

METHOD AND APPARATUS FOR AUTOMATICALLY GENERATING BANNER IMAGE, AND COMPUTER-READABLE STORAGE MEDIUM

CROSS-REFERENCE TO RELATED APPLICATIONS

This application is a National Stage filing under 35 U.S.C. 371 of International Application No. PCT/KR2021/003168, filed on Mar. 15, 2021, which claims the benefit of earlier filing date and right of priority to Korean Application No. 10-2020-0031980, filed on Mar. 16, 2020 in the Korean Intellectual Property Office, the contents of which are all hereby incorporated by reference herein in their entirety.

BACKGROUND OF THE DISCLOSURE

Field of the Disclosure

The present disclosure relates to image generation, and more particularly, to an apparatus and method for automatically generating banner images having a plurality of sizes, and a computer-readable storage medium.

Related Art

With the development of information and communication technology, electronic commerce (e-commerce) through online has also developed at a rapid pace. In e-commerce through online, various additional sales and promotion methods, as well as sales methods existing in traditional markets, have been employed. Generation of a banner image is essential for promotion in an e-commerce method. However, sizes of required banner images are different depending on the usage to which banner images are to be applied, and for banner images having different sizes, a design procedure for each image has to be carried out separately in the related art, so it takes a lot of work and high costs.

SUMMARY OF THE DISCLOSURE

The present disclosure provides a method for automatically generating a banner image for a promotion, which may automatically generate each banner image having a plurality of sizes based on information on a promotion to be carried out.

The present disclosure also provides an apparatus for automatically generating a banner image for a promotion, which may automatically generate each banner image having a plurality of sizes based on information on a promotion to be carried out.

The present disclosure also provides a computer-readable storage medium including instructions executable by a processor, which may automatically generate each banner image having a plurality of sizes based on information on a promotion to be carried out.

However, the problems to be solved by the present disclosure are not limited thereto, and may be variously expanded without departing from the spirit and scope of the present disclosure.

In an aspect, a method for automatically generating a banner image for a promotion, performed by a computing device including a processor and a memory, including: acquiring information on which of a plurality of predefined concept classifications a product or service to be promoted corresponds to; determining a set value for a foundation that is a minimum unit configuring a design of a banner image based on a concept classification to which the product or service to be promoted belongs; determining at least one component included in a banner image based on a set value for the foundation; and generating at least one banner template including component arrangement information that is information on a position and size of each of the at least one component.

According to an aspect, the method may further include: acquiring at least one of text information and image information to be included in the at least one component; and automatically generating at least one banner image based on the banner template and at least one of the text information and the image information.

According to an aspect, each of the at least one banner template may include component arrangement information in each of a plurality of banner images having different image sizes, and the automatically generating of the banner image may include automatically generating a plurality of banner images having different image sizes based on component arrangement information in each of the plurality of banner images.

According to an aspect, the foundation may include a color foundation, a typography foundation, and an iconography foundation.

According to an aspect, the color foundation may include a primary color; a primary-light color (P-light color) that is a brightness up-regulating color for the primary color; a primary-dark color (P-dark color) that is a brightness down-regulating color for the primary color; a secondary color; a secondary-light color (S-light color) that is a brightness up-regulating color for the secondary color; and a secondary-dark color (S-dark color) that is a brightness down-regulating color for the secondary color.

According to an aspect, the set value for the color foundation may include a color code.

According to an aspect, the typography foundation may include a font type, a font size, and a character spacing.

According to an aspect, the iconography foundation may include information on whether an icon is filled with color, an icon filling color, a shape of an icon, and whether an outline exists.

According to an aspect, the at least one component may include a text component, a button component, and a label component.

According to an aspect, the component arrangement information may include information on a location and size of each of the at least one component included in the banner image.

In another aspect, an apparatus for automatically generating a banner image for promotion, including a processor and a memory, wherein the processor is configured to acquire information on which of a plurality of predefined concept classifications a product or service to be promoted corresponds to, determine a set value for a foundation that is a minimum unit configuring a design of a banner image based on a concept classification to which the product or service to be promoted belongs, determine at least one component included in a banner image based on a set value for the foundation, generate at least one banner template including component arrangement information that is information on a position and size of each of the at least one component.

According to an aspect, the apparatus may further include: acquiring at least one of text information and image information to be included in the at least one component; and automatically generating at least one banner image based on the banner template and at least one of the text information and the image information.

According to an aspect, each of the at least one banner template may include component arrangement information in each of a plurality of banner images having different image sizes, and the automatically generating of the banner image may include automatically generating a plurality of banner images having different image sizes based on component arrangement information in each of the plurality of banner images.

According to an aspect, the foundation may include a color foundation, a typography foundation, and an iconography foundation.

According to an aspect, the color foundation may include a primary color; a primary-light color (P-light color) that is a brightness up-regulating color for the primary color; a primary-dark color (P-dark color) that is a brightness down-regulating color for the primary color; a secondary color; a secondary-light color (S-light color) that is a brightness up-regulating color for the secondary color; and a secondary-dark color (S-dark color) that is a brightness down-regulating color for the secondary color.

According to an aspect, the set value for the color foundation may include a color code.

According to an aspect, the typography foundation may include a font type, a font size, and a character spacing.

According to an aspect, the iconography foundation may include information on whether an icon is filled with color, an icon filling color, a shape of an icon, and whether an outline exists.

According to an aspect, the at least one component may include a text component, a button component, and a label component.

According to an aspect, the component arrangement information may include information on a location and size of each of the at least one component included in the banner image.

In another aspect, a computer-readable storage medium is a computer-readable storage medium including instructions executable by a processor, wherein the instructions are instructions for automatically generating a banner image for promotion and the instructions are configured to enable the processor to acquire information on which of a plurality of predefined concept classifications a product or service to be promoted corresponds to, determine a set value for a foundation that is a minimum unit configuring a design of a banner image based on a concept classification to which the product or service to be promoted belongs, determine at least one component included in a banner image based on a set value for the foundation, generate at least one banner template including component arrangement information that is information on a position and size of each of the at least one component.

The disclosed technology may have the following effects. However, this does not mean that a specific embodiment should include all of the following effects or only the following effects, so the scope of the disclosed technology should not be construed as being limited thereby.

According to the apparatus and method for automatically generating a banner image for promotion according to an embodiment of the present disclosure described above, each banner image having a plurality of sizes may be automatically generated based on information on the promotion.

Accordingly, an operator of an online shopping mall may automatically proceed from planning to production if the operator has a will to promote it.

Figure 1:
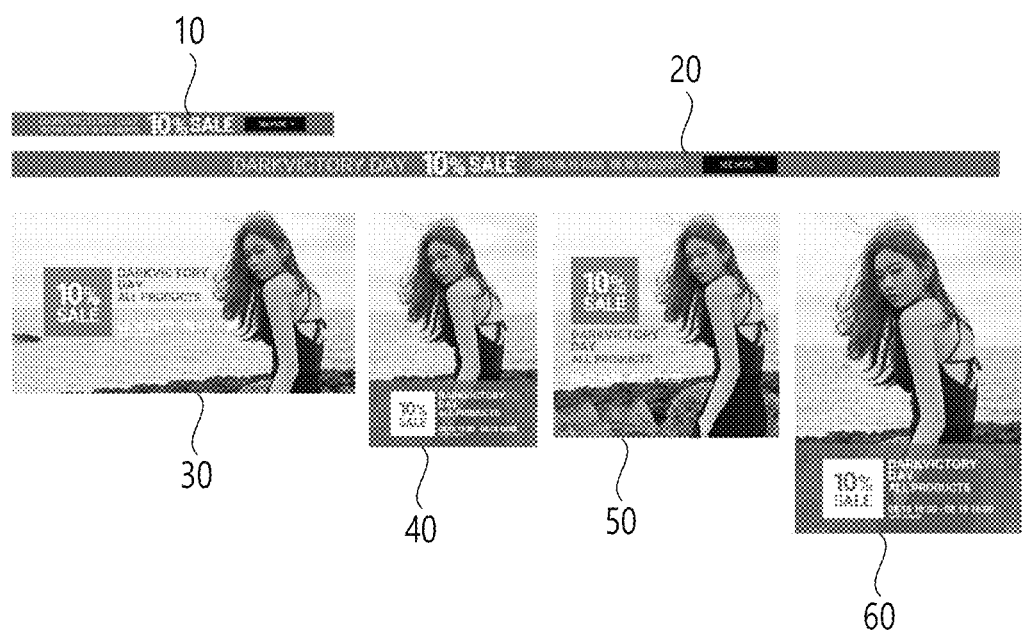
FIG. 1 is a diagram of a plurality of banner images having different image sizes.

DESCRIPTION OF EXEMPLARY
EMBODIMENTS

While the present disclosure may be modified in various ways and take on various alternative forms, specific embodiments thereof are shown in the drawings and described in detail below.

However, it should be understood that there is no intent to limit the present disclosure to the particular forms disclosed, but on the contrary, the present disclosure covers all modifications, equivalents, and alternatives falling within the spirit and scope of the present disclosure.

It will be understood that, although the terms "first," "second," etc. May be used herein to describe various elements, these elements should not be limited by these terms. These terms are only used to distinguish one element from another. For example, a first element could be termed a second element, and a second element could similarly be termed a first element without departing from the scope of the present disclosure. As used herein, the term "and/or" includes any and all combinations of one or more of the associated listed items.

When it is mentioned that a certain element is "connected to" or "electrically connected to" a second element, the first element may be directly connected or electrically connected to the second element, but it should be understood that a third element may intervene therebetween. Meanwhile, when it is mentioned that a certain element is "directly connected to" or "directly electrically connected to" a second element, it should be understood that there is no third element therebetween.

The terminology used herein to describe embodiments of the present disclosure is not intended to limit the scope of the present disclosure. The articles "a," and "an" are singular in that they have a single referent, however the use of the singular form in the present document should not preclude the presence of more than one referent. In other words, elements of the present disclosure referred to in the singular may number one or more, unless the context clearly indicates otherwise. It will be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless defined in a different way, all the terms used herein including technical and scientific terms have the same meanings as understood by those skilled in the art to which the present disclosure pertains. Such terms as defined in generally used dictionaries should be construed to have the same meanings as those of the contexts of the related art, and unless clearly defined in the application, they should not be construed to have ideally or excessively formal meanings.

Hereinafter, embodiments of the present disclosure will be described in detail with reference to the accompanying drawings. In describing the present disclosure, in order to facilitate overall understanding of the present disclosure, the same reference numerals indicate the same members throughout the accompanying drawings and redundant descriptions of the same components will be omitted.

As described above, with the development of information and communication technology, electronic commerce (e-commerce) through online has also developed at a rapid pace. In e-commerce through online, various additional sales and promotion methods, as well as sales methods existing in traditional markets, have been employed. Generation of a banner image is essential for promotion in an e-commerce method. However, sizes of required banner images are different depending on the usage to which banner images are to be applied, and for banner images having different sizes, a design procedure for each image has to be carried out separately in the related art, so it takes a lot of work and high costs.

In order to solve the aforementioned problem of the present disclosure, each banner image having a plurality of sizes may be automatically generated based on information on a promotion to be carried out. Accordingly, an operator of an online shopping mall may easily proceed with a promotion through a system that takes care of a process from planning to production if the operator has a will to promote it.

A method and apparatus for automatically generating a banner according to an embodiment of the present disclosure may provide a promotion operation/production platform. According to the promotion operation/production platform as described above, core production technology may be implemented, promotion production/operation may be optimized, and promotion production/operation may be advanced.

First, with respect to the implementation of the core production technology, a core production technology for automatically creating a promotion is provided to strengthen the foundation and overcome the limitations of template design.

In this regard, according to an aspect of the present disclosure, a flexible template may be provided. FIG. 1 is a diagram of a plurality of banner images having different image sizes. According to an aspect of the present disclosure, an advanced template production technology that overcomes the limitations of templates produced only in one size so far may be implemented.

As shown in FIG. 1, on-line, banner images that may be produced to promote an online shopping mall may have various sizes. Like a banner image 10 having a first size and a banner image 20 having a second size, there may be a banner image including only of text and a button without a separate photo or picture, and like a banner image 30 having a third size and a banner image 50 having a fifth size, there may be a batter image in which text is appropriately disposed on a photo image, and like a banner image 40 having a fourth size and a banner image 60 having a sixth size, a certain region may be classified as a text region on a photo image and a banner image in which text information is disposed in the corresponding text region may be implemented.

The banner images as exemplarily illustrated in FIG. 1 may be implemented to have different sizes according to different uses. For example, each of the banner images may be a PC web page main banner/mobile/newsletter/event bulletin board/banner image for SNS. That is, for example, banners having six sizes may be required, or banners having a larger size may be required.

In the related art, in order to make banners having different sizes as described above, a separate design work may be required for each banner, involving a lot of manhours, and accordingly, the production cost is also increased, which may be a big obstacle to the progress of a promotion. In order to solve the above problems, according to an aspect of the present disclosure, it a flexible template, a template that flexibly responds to a banner with any size of images and text.

Figure 2:
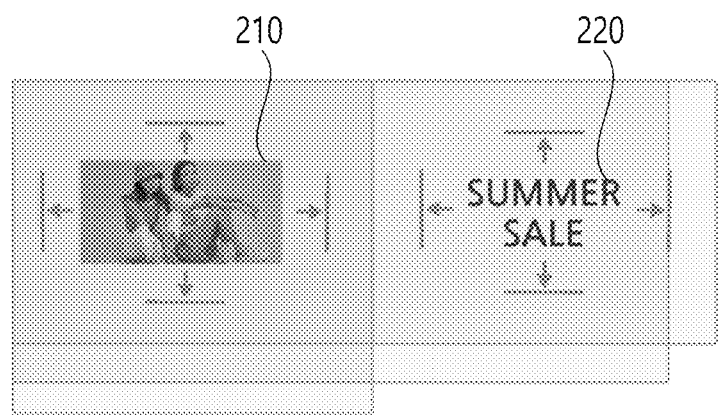
FIG. 2 is a diagram of component arrangement adaptive to a size of a banner image according to an aspect of the present disclosure.

FIG. 2 is a diagram of component arrangement adaptive to a size of a banner image according to an aspect of the present disclosure. As shown in FIG. 2, a flexible template provided according to an apparatus and method for automatically generating a banner according to an embodiment of the present disclosure is a size-adaptive banner template, in which a region occupied by an image component 210 or a text component 220 or a position thereof in a banner image is adaptively determined according to sizes of banner images, so that a user may automatically produce six or more banners if only one template is produced.

Meanwhile, an apparatus and method for automatically generating a banner according to an aspect of the present disclosure may provide a design system. An advanced template production technology overcomes the limitations of templates expressed only in one design style so far may overcome the aesthetic limitations of expressions of the related art template in which one template may have one template design concept and when a selected template is different from a concept of a shop, the selected template is awkward and inconsistent.

Figure 3:
FIG. 3 is a diagram of a font change for a text component in a banner image.
Figure 4:
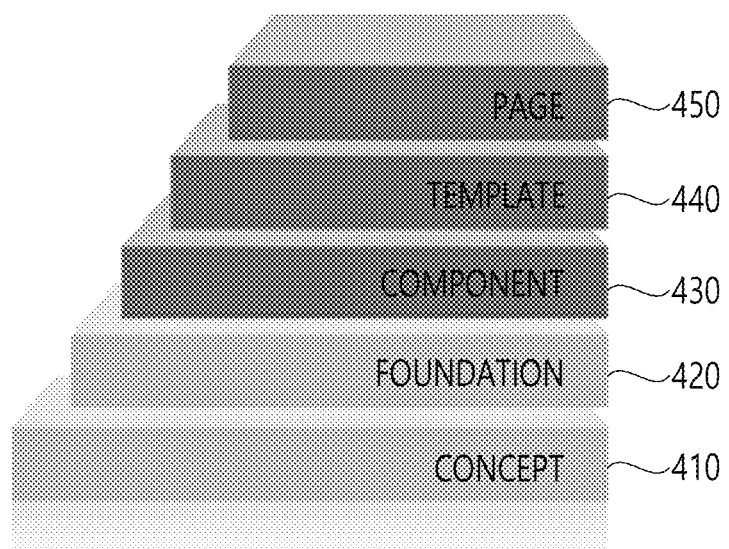
FIG. 4 shows a hierarchical structure of a banner image that may be applied to a method for automatically generating a banner image according to an embodiment of the present disclosure.

FIG. 3 is a diagram of a font change for a text component in a banner image. The template according to the related art has a limitation in that it may only be expressed in one way according to a unique design concept of the template. In this regard, in a design system provided according to an embodiment of the present disclosure, a template design is structured into five hierarchies (concept, foundation, component, template, page) to define and adjust a base layer to control a higher layer. FIG. 4 shows a hierarchical structure of a banner image that may be applied to a method for automatically generating a banner image according to an embodiment of the present disclosure.

As shown in FIG. 3, when a font and font color adjustment 300 is performed, a pre-change text component 310 in the existing banner image may have a shape such as a post-change text component 320.

As shown in FIG. 4, according to an aspect of the present disclosure, a design for a banner image may be structured into five layers, and a base layer may be defined and adjusted to control an upper layer. From a lower layer, a concept 410, a foundation 420, a component 430, a template 440, and a page 450 or banner image generated based thereon may be layered. Details thereof are described hereinafter.

Figure 5:
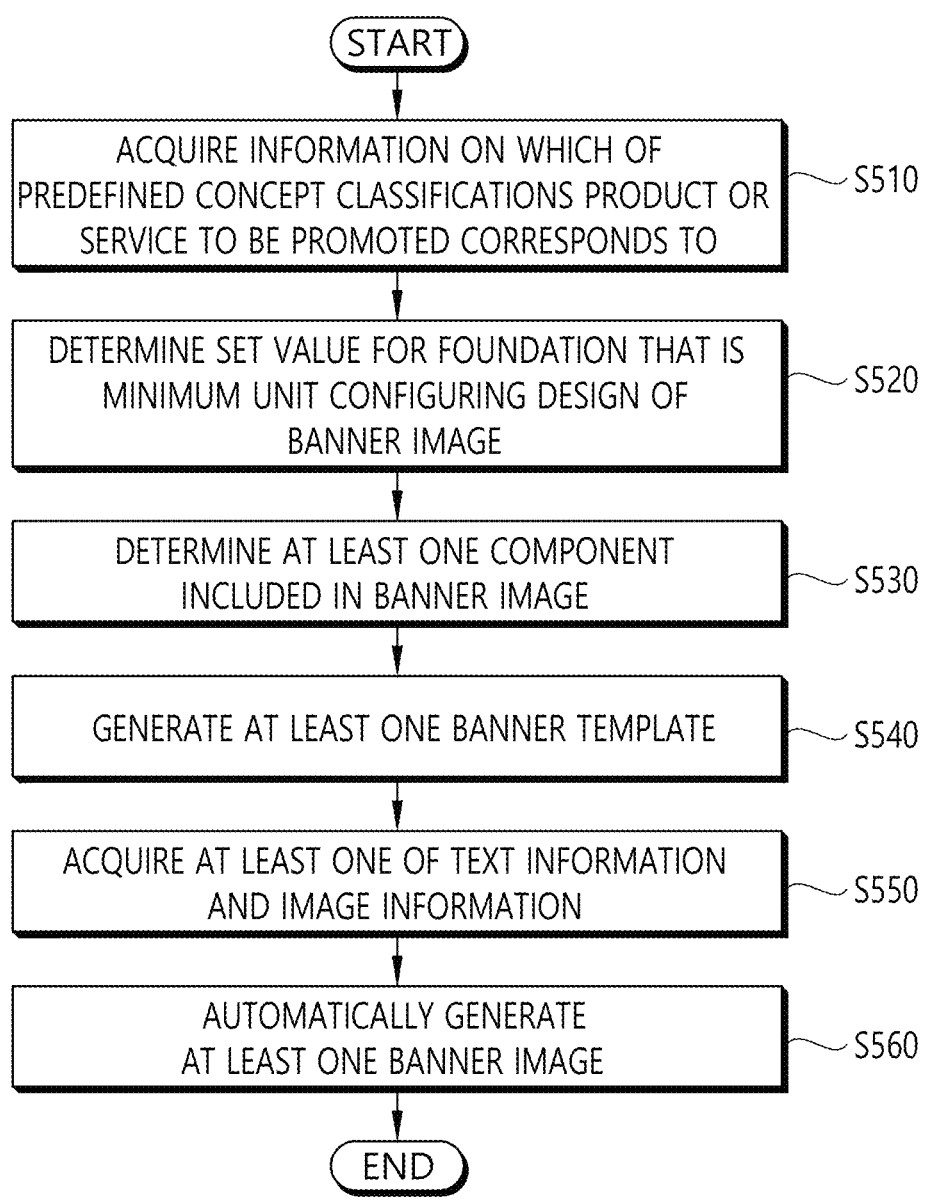
FIG. 5 is an exemplary flowchart of a method for automatically generating a banner image according to an embodiment of the present disclosure.

FIG. 5 is an exemplary flowchart of a method for automatically generating a banner image according to an embodiment of the present disclosure. Hereinafter, a method for automatically generating a banner image according to an embodiment of the present disclosure will be described in more detail with reference to FIG. 5.

According to an embodiment of the present disclosure, a method for automatically generating a banner image for a promotion may be performed by a computing device including a processor and a memory. As shown in FIG. 5, according to the method for automatically generating a banner image according to an embodiment of the present disclosure, first, information on which of a plurality of predefined concept classifications a product or service to be promoted corresponds to may be acquired (step 510).

Figure 6:
FIG. 6 is a diagram of concept classification according to an aspect of the present disclosure.

In this regard, FIG. 6 is a diagram of concept classification according to an aspect of the present disclosure. As shown in FIG. 6, a concept may be a classification indicating a design identity that a banner image may have. For example, an example concept classification may be generated by analyzing and patterning design identities of 100 major Internet shopping malls and classifying them into four concepts as shown in FIG. 6. As shown in FIG. 6, illustratively, the concept may function as a classification of design or emotions representing a characteristic or identity of a design aspect that a banner design may have, such as casual 610/modern 620/unique 630/classic 640.

According to an aspect of the present disclosure, a predetermined concept classification may be determined by classification based on at least one of a pre-existing Internet shopping mall or site or a representative image for each brand, or may be determined by setting a classification and a condition corresponding to each classification.

Acquiring information on which of a plurality of predefined concept classifications a product or service to be promoted as shown in FIG. 6 corresponds to may be acquired differently according to various embodiments. For example, according to an aspect, a user may directly select a specific concept classification according to an input from the user. Or, for example, in order for a concept classification to be automatically performed according to software model capable of performing automatic classification like a trained artificial neural network, information related to a product or service to be promoted may be input and concept classification may be automatically performed based on the information. The related information may include various information including at least one image for a product or service to be promoted, a name of a product or service, or text, image, video, or sound information, such as a user's answer to an example question.

Referring back to FIG. 5, when the concept classification of the product or service to be promoted is determined, a set value for a foundation that is a minimum unit of configuring a design of a banner image may be determined based on the concept classification to which the product or service to be promoted belongs (step 520).

As described above, according to an aspect of the present disclosure, a hierarchical structure may be provided for banner design, and a foundation may be determined differently according to a determined concept based on the hierarchical structure. The foundation may be a minimum unit constituting the design of the banner image, and, for example, the foundation may include a color foundation, a typography foundation, and an iconography foundation.

Figure 7:
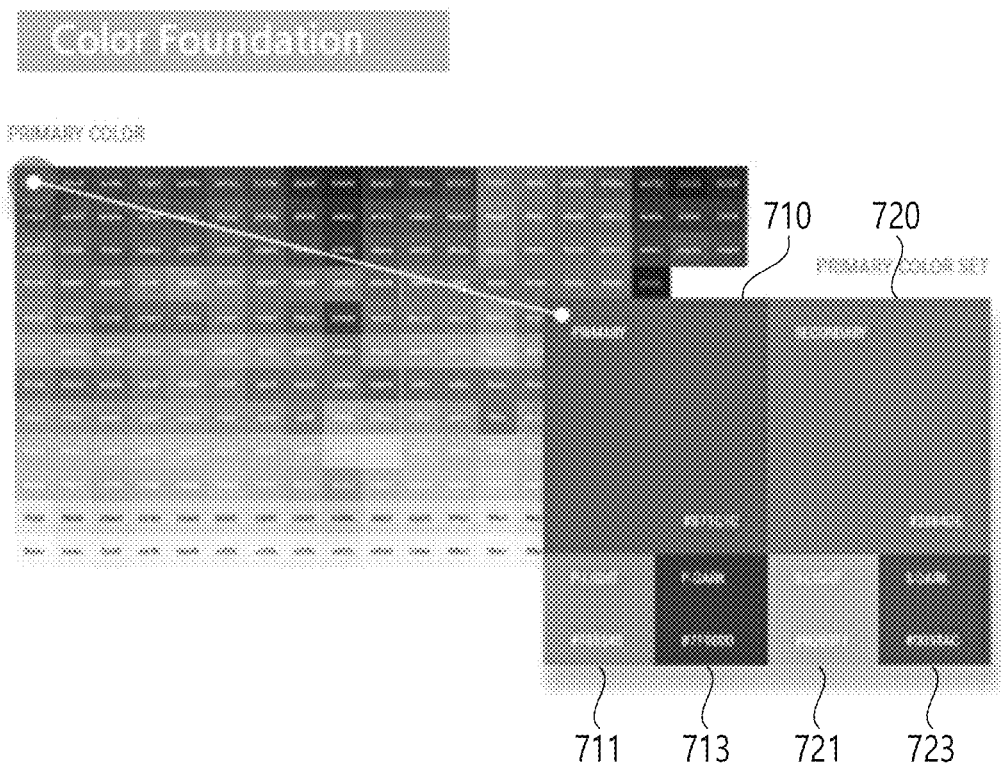
FIG. 7 is an exemplary view of a color foundation according to an aspect of the present disclosure.

FIG. 7 is an exemplary view of a color foundation according to an aspect of the present disclosure. As shown in FIG. 7, the color foundation a primary color; a primary-light color (P-light color) that is a brightness up-regulating color for the primary color; a primary-dark color (P-dark color) that is a brightness down-regulating color for the primary color; a secondary color; a secondary-light color (S-light color) that is a brightness up-regulating color for the secondary color; and a secondary-dark color (S-dark color) that is a brightness down-regulating color for the secondary color.

As shown in FIG. 7, for example, a primary color 710 may be red, a coral color having a higher brightness compared to the primary color 710 may be set to a primary light color 711, a dark red color, which has a lower brightness compared to the primary color 710, may be set to a primary dark color 713. Also, as shown in FIG. 7, for example, a secondary color 720 may be a blue color, a light blue having a higher brightness than the secondary color 720 may be set to secondary light color 721, and a dark blue color, which has a lower brightness compared to the secondary color 720, may be set to secondary dark color 723. Although the secondary color and the primary color are illustrated in FIG. 7, various colors may be used in a single banner design by setting light color and dark color for each of first, second, and third colors according to an embodiment.

According to an aspect, the set value for the color foundation may include a color code. Based on the set value of the color foundation, in which of the components included in the banner design, the primary color, the secondary color, or a primary light color or primary dark color is to be used may be determined.

As described above, the color foundation may be determined differently according to a concept, and a color that best represents each concept classification may be previously determined.

Figure 8:
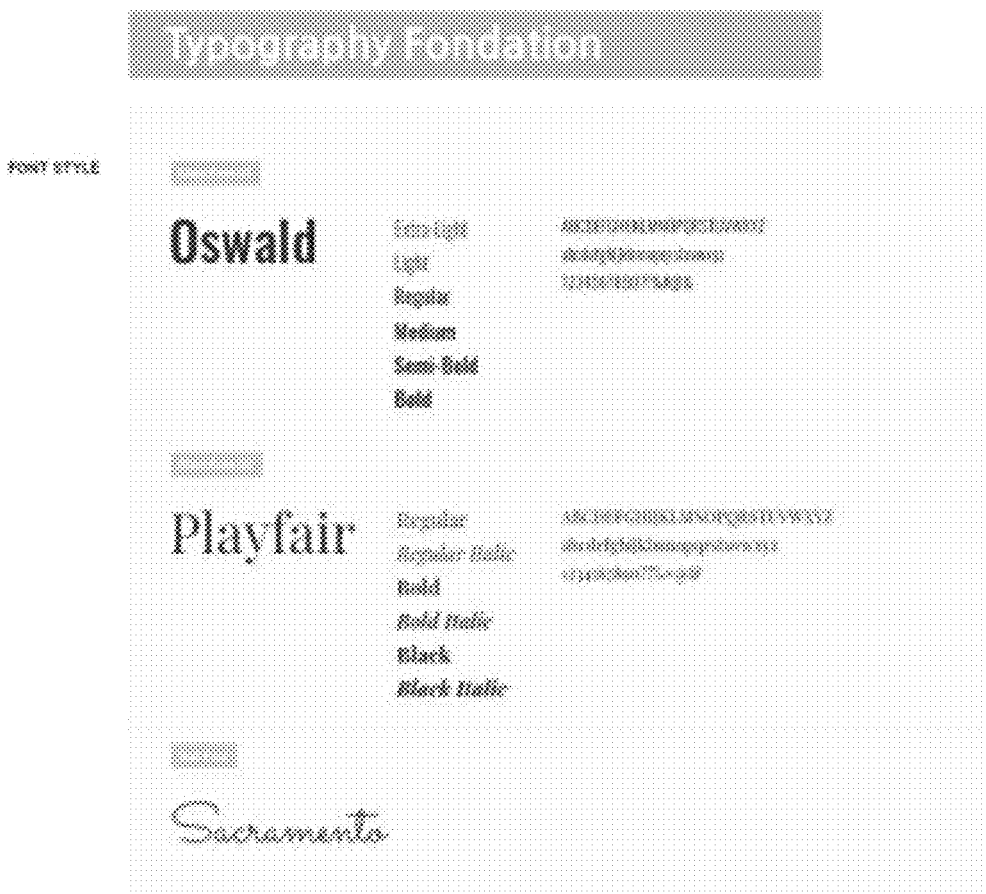
FIG. 8 is an exemplary view of a typography foundation according to an aspect of the present disclosure.

FIG. 8 is a view of a typography foundation according to an aspect of the present disclosure. As shown in FIG. 8, the font foundation may include a font type, a font size, and a character spacing.

As described above, the font foundation is determined based on the concept classification related to a product or service to be promoted, and thus, at least one of a font type, a font, and a character spacing that may best represent the concept classification may be previously determined. Accordingly, a font, size, and character spacing corresponding to the concept may be automatically applied to the banner image according to an aspect of the present disclosure, thereby achieving a font-related design suitable for the concept without additional effort.

Figure 9:
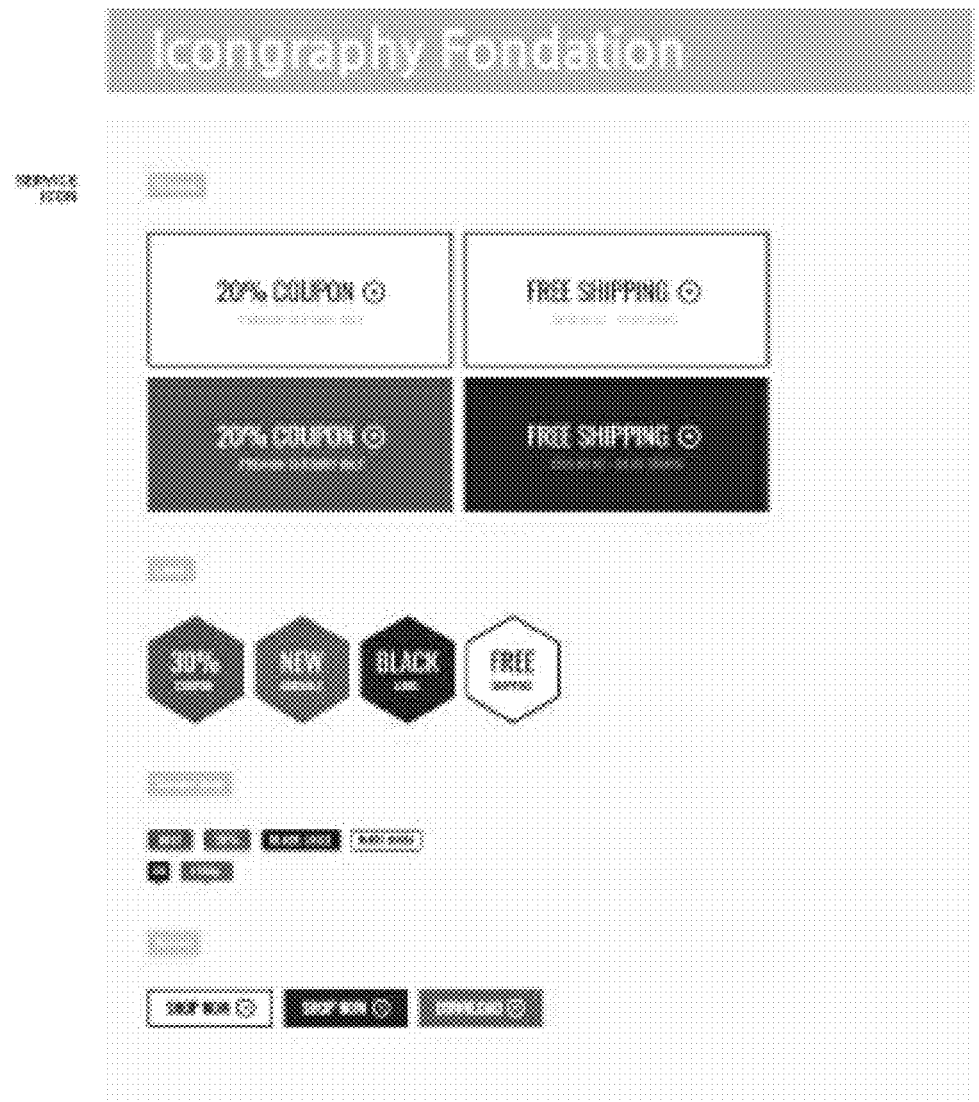
FIG. 9 is a diagram of an iconography foundation according to an aspect of the present disclosure.

FIG. 9 is a diagram of an iconography foundation according to an aspect of the present disclosure. As shown in FIG. 9, the iconography foundation may include information on whether an icon is filled with a color, an icon filling color, a shape of an icon, and whether an outline exists.

As described above, the iconography foundation is determined based on the concept classification related to a product or service to be promoted, and thus, in order for an icon or button best representing the concept classification to be included in the banner image, the iconography foundation may include at least one of whether a background of an icon or button is filled, a most proper color when the background of an icon or button is filled, a form or shape of an icon or button such as whether an icon is rectangular, square, or polygonal, whether a corner of an icon or button is rounded, whether an icon or button includes two tones, and whether an icon or button has an outline, so that a design factor of an icon graphic may be previously determined according to each concept classification to best represent concept classification related to a product or service to be promoted.

Figure 10:
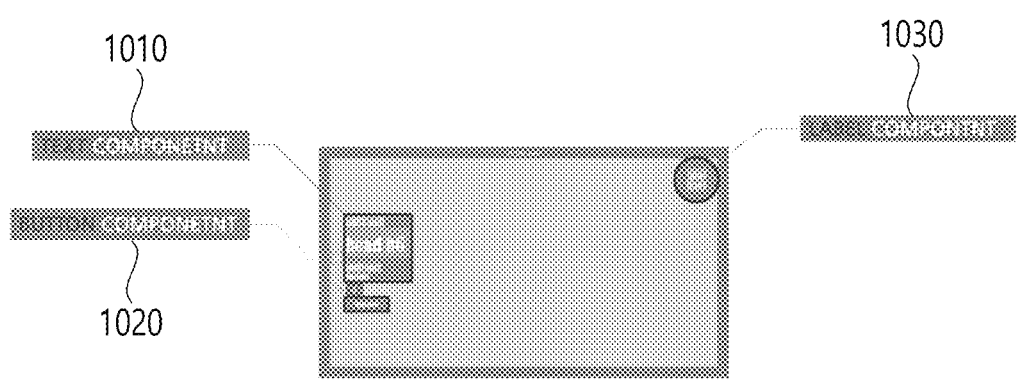
FIG. 10 is a diagram of component arrangement according to an aspect of the present disclosure.

Referring back to FIG. 5, at least one component included in the banner image may be determined based on the set value for the foundation (step 530). FIG. 10 is a diagram of a component arrangement according to an aspect of the present disclosure. As shown in FIG. 10, the component may include, for example, a text component, a button component, and a label component.

The determining of at least one component to be included in the banner image may include, for example, determining whether the banner image includes, for example, at least one of a text component 1010, a button component 1020, and a label component 1030. In addition, the determining of at least one component included in the banner image may include, for example, determining which type of at least one of a text component 1010, a button component 1020, and a label component 1030 is to be included.

The determining of at least one component included in the banner image may be determined based on at least one of a concept classification to which a product or service to be promoted belongs and a set value for a foundation. For example, selection of components that may best represent each concept may be previously determined to be determined according to the concept classification. In addition, selection of the most appropriate component may be previously determined according to a foundation set value determined according to concept classification.

Referring back to FIG. 5, after the component is determined, at least one banner template including component arrangement information, which is information on a position and size of each of at least one component, may be generated (step 540). As discussed above, FIG. 10 is a diagram of a component arrangement according to an aspect of the present disclosure. As shown in FIG. 10, for each of a plurality of components including, for example, at least one of a text component 1010, a button component 1020, and a label component 1030, a position of a corresponding component within the banner image may be determined. Also, for each of the plurality of components including, for example, at least one of the text component 1010, the button component 1020, and the label component 1030, a size occupied by the corresponding component in the banner image may be determined. The component arrangement information may include information on a location and size of each component included in the banner image.

Meanwhile, the component arrangement information may be determined by a predetermined rule based on at least one of a concept classification related to each banner image, a foundation set value, and a determined type of component.

Figure 11:
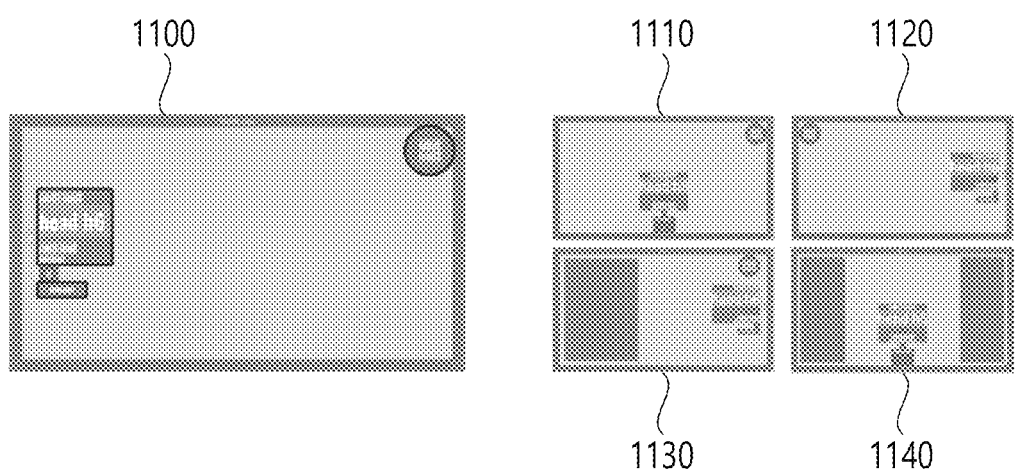
FIG. 11 is a diagram of a plurality of banner templates having different component arrangements.

Also, FIG. 11 is a diagram of a plurality of banner templates having different component arrangements. As shown in FIG. 11, for example, even for a banner image having the same size, positions and sizes of various components, such as a first component arrangement 1100, a second component arrangement 1110, a third component arrangement 1120, a fourth component arrangement 1130, and a fifth component arrangement 1140, may exist.

In addition, each of the at least one banner template may include component arrangement information in each of a plurality of banner images having different image sizes. That is, for a banner image having a first size, for example, information on a position at which at least one of a text component 1010, a button component 1020, and a label component 1030 is disposed, and a size of at least one of the text component 1010, the button component 1020, and the label component 1030 may be included, and for a banner image having a second size different from the first size, information on a position at which at least one of the text component 1010, the button component 1020, and the label component 1030 is disposed and a size of at least one of the text component 1010, the button component 1020, and the label component 1030 may be included. Accordingly, after at least one banner template is generated, banners having various sizes may be easily generated by simply inputting information.

For example, referring back to FIG. 5, at least one of text information and image information to be included in at least one component may be acquired (step 550). The text information or image information to be included in at least one component may be acquired in various forms according to embodiments. For example, text information may be acquired by allowing the user to directly input text information to be input, or exemplary sample text information may be provided for the user to modify. Also, as the image information, an image file owned by the user may be directly input, or at least one of the sample images may be provided for the user to select.

When text information and image information are acquired, at least one banner image may be automatically generated based on a banner template and at least one of the text information and image information (step 560). Since the banner template includes information on an arrangement of at least one component, a position and size of at least one component may be determined, and text and/or image included in the at least one component may be determined through any one of the text information and the image information.

As described above, since each of the at least one banner template includes component arrangement information in each of a plurality of banner images having different image sizes, in the automatically generating (step 560) of a banner image, a plurality of banner images having different image sizes may be automatically generated based on the component arrangement information in each of the plurality of banner images. Accordingly, the user may easily acquire banner images having various sizes by simply inputting or selecting the text information and image information. In addition, since the banner image according to an aspect of the present disclosure is formed by a hierarchical structure including concept classification, foundation, component and template, a banner image of a concept suitable for a product or service to be promoted may be easily acquired.

Figure 12:
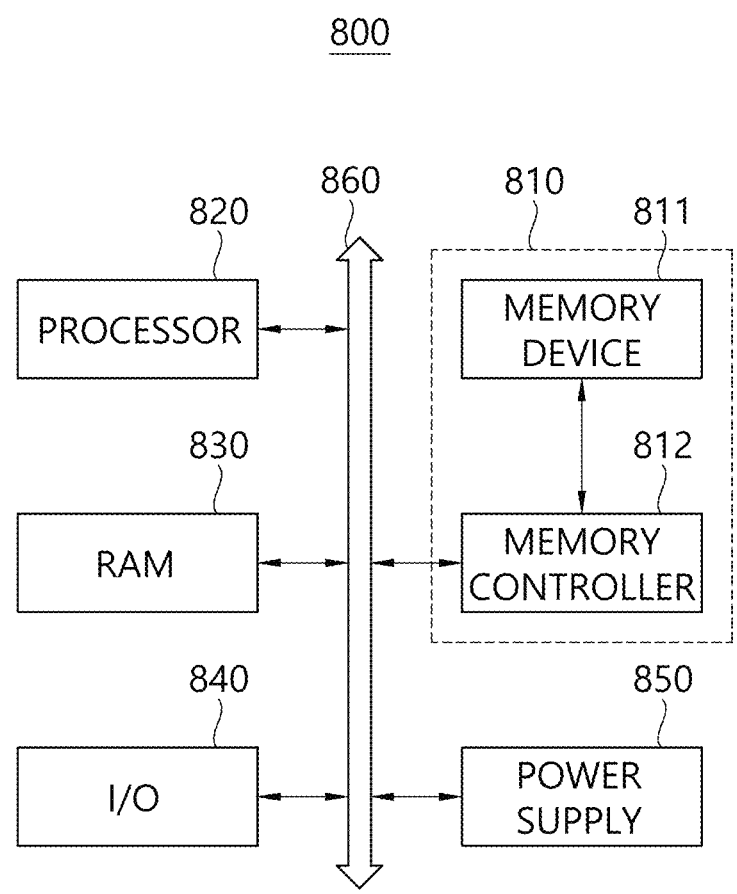
FIG. 12 is a block diagram illustrating a configuration of a computing system that may be implemented as an apparatus for automatically generating a banner according to an embodiment of the present disclosure.

FIG. 12 is a block diagram illustrating a configuration of a computing system that may be implemented as an apparatus for automatically generating a banner according to an embodiment of the present disclosure. Referring to FIG. 12, a computing system 800 may include a flash storage 810, a processor 820, a RAM 830, an input/output (I/O) device 840, and a power supply 850. Also, the flash storage 810 may include a memory device 811 and a memory controller 812. Meanwhile, although not shown in FIG. 8, the computing system 800 may further include ports capable of communicating with a video card, a sound card, a memory card, a USB device, etc., or communicating with other electronic devices.

The computing system 800 may be implemented as a personal computer or as a portable electronic device, such as a notebook computer, a mobile phone, a personal digital assistant (PDA), and a camera.

The processor 820 may perform certain calculations or tasks. According to an embodiment, the processor 820 may be a micro-processor or a central processing unit (CPU). The processor 820 may perform communication with the RAM 830, the I/O device 840, and the flash storage 810 through a bus 860, such as an address bus, a control bus, and a data bus. The flash storage 810 may be implemented using the flash storage of the embodiments shown in FIGS. 5 to 7.

According to an embodiment, the processor 820 may also be connected to an expansion bus, such as a peripheral component interconnect (PCI) bus.

The RAM 830 may store data necessary for the operation of the computing system 800. For example, any type of random access memory including DRAM, mobile DRAM, SRAM, PRAM, FRAM, MRAM, RRAM may be used as the RAM 830.

The I/O device 840 may include input means, such as a keyboard, keypad, and mouse, and output means, such as a printer and a display. The power supply 850 may supply an operating voltage necessary for the operation of the computing system 800.

An apparatus for automatically generating a banner according to an embodiment of the present disclosure may be implemented by, for example, the computing device including a processor and a memory as shown in FIG. 12. According to an aspect, the processor of the apparatus for automatically generating a banner image for a promotion may be configured to acquire information on which of a plurality of predefined concept classifications a product or service to be promoted corresponds to, determine a set value for a foundation that is a minimum unit configuring a design of a banner image based on a concept classification to which the product or service to be promoted belongs, determine at least one component included in a banner image based on a set value for the foundation, generate at least one banner template including component arrangement information that is information on a position and size of each of the at least one component.

According to an aspect, the apparatus may further include: acquiring at least one of text information and image information to be included in the at least one component; and automatically generating at least one banner image based on the banner template and at least one of the text information and the image information.

According to an aspect, each of the at least one banner template may include component arrangement information in each of a plurality of banner images having different image sizes, and the automatically generating of the banner image may include automatically generating a plurality of banner images having different image sizes based on component arrangement information in each of the plurality of banner images.

According to an aspect, the foundation may include a color foundation, a typography foundation, and an iconography foundation.

According to an aspect, the color foundation may include a primary color; a primary-light color (P-light color) that is a brightness up-regulating color for the primary color; a primary-dark color (P-dark color) that is a brightness down-regulating color for the primary color; a secondary color; a secondary-light color (S-light color) that is a brightness up-regulating color for the secondary color; and a secondary-dark color (S-dark color) that is a brightness down-regulating color for the secondary color.

According to an aspect, the set value for the color foundation may include a color code. According to an aspect, the typography foundation may include a font type, a font size, and a character spacing. According to an aspect, the iconography foundation may include information on whether an icon is filled with color, an icon filling color, a shape of an icon, and whether an outline exists.

According to an aspect, the at least one component may include a text component, a button component, and a label component. According to an aspect, the component arrangement information may include information on a location and size of each of the at least one component included in the banner image.

A detailed operation of the apparatus for automatically generating a banner according to an embodiment of the present disclosure may follow the method for automatically generating a banner according to an embodiment of the present disclosure as described above.

The method according to an embodiment of the present disclosure may be implemented as computer-readable code on a computer-readable recording medium. The computer-readable recording medium includes all kinds of recording media storing data which may be interpreted by a computer system. For example, the computer-readable recording medium may include a Read Only Memory (ROM), a Random Access Memory (RAM), a magnetic tape, a magnetic disk, a flash memory, an optical data storage device, and the like. In addition, the computer-readable recording medium may be distributed in computer systems connected to a computer network, and may be stored and executed as a code readable in a distribution manner.

While the present disclosure has been described with reference to the accompanying drawings and exemplary embodiments, it is to be understood that the invention is not limited by the accompanying drawings and embodiments. It will be understood by those skilled in the art that various changes in form and details may be made therein without departing from the spirit and scope of the invention as defined by the appended claims.

Specifically, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features may be implemented in at least one computer programs that may be executed on a programmable system including at least one programmable processor, at least one input device, and at least one output device which are combined to receive data and directives from a data storage system and to transmit data and directives to the data storage system. A computer program includes a set of directives that may be used directly or indirectly within a computer to perform a particular operation on a certain result. A computer program may be written in any form of programming language including compiled or interpreted languages, and may be used in any form included as modules, elements, subroutines, or other units suitable for use in other computer environments or independently operable programs.

Suitable processors for execution of the program of directives include, for example, both general-purpose and special-purpose microprocessors, and a single processor or one of multiple processors of other type of computer. In addition, storage devices suitable for implementing the computer program directives and data implementing the described features include, for example, semiconductor memory devices such as EPROM, EEPROM, and flash memory devices, magnetic devices such as internal hard disks and removable disks, magneto-optical disks, and all forms of nonvolatile memories including CD-ROM and DVD-ROM disks. The processor and memory may be integrated within Application-Specific Integrated Circuits (ASICs) or added by ASICs.

While the present disclosure has been described on the basis of a series of functional blocks, it is not limited by the embodiments described above and the accompanying drawings, and it will be apparent to those skilled in the art that various substitutions, modifications and variations may be made without departing from the scope of the present disclosure.

The combination of the aforementioned embodiments is not limited to the aforementioned embodiments, and various forms of combination in addition to the aforementioned embodiments may be provided according to implementation and/or necessity.

In the aforementioned embodiments, the methods are described on the basis of a flowchart as a series of operations or blocks, but the present disclosure is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present disclosure.

The aforementioned embodiments include examples of various aspects. While it is not possible to describe every possible combination for expressing various aspects, one of ordinary skill in the art will recognize that other combinations are possible. Accordingly, it is intended that the present disclosure include all alternatives, modifications and variations that fall within the scope of the following claims.

What is claimed is:

1. A method for automatically generating a banner image for a promotion, performed by a computing device including a processor and a memory, the method comprising:
    acquiring information on a plurality of predefined concept classifications corresponding to a product or service to be promoted;
    determining a set value for a foundation that is a minimum unit configuring a design of a banner image based on a concept classification to which the product or service to be promoted belongs;
    determining a type of each of a plurality of components to be included in a banner image based on the set value for the foundation, the plurality of components including a determined type of text component, a determined type of button component, and a determined type of label component; and
    generating at least one banner template including location information and size information for each of the text component, the button component, and the label component, the location information setting a position of a corresponding component within the banner image, the size information fixing an occupied area of the corresponding component within the banner image.

2. The method of claim 1, further comprising:
    acquiring at least one of text information and image information to be included in the plurality of components; and
    automatically generating at least one banner image based on the at least one banner template and the at least one of text information and image information.

3. The method of claim 2, wherein
    the at least one banner image includes a plurality of banner images having different image sizes,
    each of the at least one banner template includes component arrangement information for each of the plurality of banner images,
    the component arrangement information is determined according to a predetermined rule based on at least one predefined concept classification of the plurality of predefined concept classifications relative to each of the plurality of banner images, a foundation set value, and a determined type of component, and
    the plurality of banner images are generated based on the component arrangement information.

4. The method of claim 1, wherein
    the banner image of the at least one banner template of the plurality of components is formed as a page atop a hierarchical structure formed sequentially of concept classification, foundation, component, and template, and
    the foundation is determined differently according to each of the predefined concept classifications and includes a color foundation, a typography foundation, and an iconography foundation.

5. The method of claim 4, wherein the color foundation includes information on each of:
    a primary color;
    a primary-light color (P-light color) that is a brightness up-regulating color for the primary color;
    a primary-dark color (P-dark color) that is a brightness down-regulating color for the primary color;
    a secondary color;
    a secondary-light color (S-light color) that is a brightness up-regulating color for the secondary color; and
    a secondary-dark color (S-dark color) that is a brightness down-regulating color for the secondary color.

6. The method of claim 4, wherein the set value for the color foundation includes a color code.

7. The method of claim 4, wherein the typography foundation includes information on each of a font type, a font size, and a character spacing.

8. The method of claim 4, wherein the iconography foundation includes
    information on whether an icon is filled with color,
    information on an icon filling color,
    information on a shape of the icon, and
    information on whether an outline of the icon exists.

9. The method of claim 4,
    wherein the iconography foundation is determined based on the concept classification, and
    wherein each of the determined type of the button component and the determined type of the label component corresponds to the concept classification.

10. The method of claim 4, wherein the iconography foundation includes information on each of
    whether a background of a button or icon of the corresponding component is filled and a preferred color when the background is filled,
    a shape of each of the button and the icon and whether a corner of the shape is rounded, whether each of the button and the icon includes two tones, and whether each of the button and the icon has an outline.

11. An apparatus for automatically generating a banner image for promotion, including a processor and a memory, wherein the processor is configured to acquire information on a plurality of predefined concept classifications corresponding to a product or service to be promoted, determine a set value for a foundation that is a minimum unit configuring a design of a banner image based on a concept classification to which the product or service to be promoted belongs, determine a type of each of a plurality of components to be included in a banner image based on the set value for the foundation, the plurality of components including a determined type of text component, a determined type of button component, and a determined type of label component, and generate at least one banner template including location information and size information for each of the text component, the button component, and the label component, the location information setting a position of a corresponding component within the banner image, the size information fixing an occupied area of the corresponding component within the banner image.

12. The apparatus of claim 11, wherein the processor is further configured to acquire at least one of text information and image information to be included in the plurality of components; and automatically generate at least one banner image based on the at least one banner template and the at least one of text information and the image information.

13. The apparatus of claim 12, wherein the at least one banner image includes a plurality of banner images having different image sizes, each of the at least one banner template includes component arrangement information for each of the plurality of banner images, the component arrangement information is determined according to a predetermined rule based on at least one predefined concept classification of the plurality of predefined concept classifications relative to each of the plurality of banner images, a foundation set value, and a determined type of component, and the plurality of banner images are generated based on the component arrangement information.

14. The apparatus of claim 11, wherein the banner image of the at least one banner template of the plurality of components is formed as a page atop a hierarchical structure formed sequentially of concept classification, foundation, component, and template, and the foundation is determined differently according to each of the predefined concept classifications and includes a color foundation, a typography foundation, and an iconography foundation.

15. The apparatus of claim 14, wherein the color foundation includes information on each of:

a primary color;

a primary-light color (P-light color) that is a brightness up-regulating color for the primary color;

a primary-dark color (P-dark color) that is a brightness down-regulating color for the primary color;

a secondary color;

a secondary-light color (S-light color) that is a brightness up-regulating color for the secondary color; and a secondary-dark color (S-dark color) that is a brightness down-regulating color for the secondary color.

16. The apparatus of claim 14, wherein the set value for the color foundation includes a color code.

17. The apparatus of claim 14, wherein the typography foundation includes information on each of a font type, a font size, and a character spacing.

18. The apparatus of claim 14, wherein the iconography foundation includes information on whether an icon is filled with color, information on an icon filling color, information on a shape of the icon, and information on whether an outline of the icon exists.

19. The apparatus of claim 14, wherein the iconography foundation is determined based on the concept classification, and wherein each of the determined type of the button component and the determined type of the label component corresponds to the concept classification.

20. The apparatus of claim 14, wherein the iconography foundation includes information on each of whether a background of a button or icon of the corresponding component is filled and a preferred color when the background is filled, a shape of each of the button and the icon and whether a corner of the shape is rounded, whether each of the button and the icon includes two tones, and whether each of the button and the icon has an outline.

* * * * *